(12) United States Patent
Lonsberry et al.

(10) Patent No.: US 12,277,369 B2
(45) Date of Patent: Apr. 15, 2025

(54) GENERATING SIMULATED WELD PATHS FOR A WELDING ROBOT

(71) Applicant: Path Robotics, Inc., Columbus, OH (US)

(72) Inventors: Alexander James Lonsberry, Gahanna, OH (US); Andrew Gordon Lonsberry, Columbus, OH (US); Matthew Klein, Columbus, OH (US); Surag Balajepalli, Columbus, OH (US); Chaojie Feng, Dublin, OH (US); Rachit Aggarwal, Columbus, OH (US); Raghav Sood, Columbus, OH (US)

(73) Assignee: Path Robotics, Inc., Columbus, OH (US)

( * ) Notice: Subject to any disclaimer, the term of this patent is extended or adjusted under 35 U.S.C. 154(b) by 0 days.

(21) Appl. No.: 17/968,150

(22) Filed: Oct. 18, 2022

(65) Prior Publication Data
US 2023/0123712 A1 Apr. 20, 2023

Related U.S. Application Data

(60) Provisional application No. 63/256,992, filed on Oct. 18, 2021.

(51) Int. Cl.
*G06F 30/20* (2020.01)
*G06F 111/04* (2020.01)
*G06F 119/02* (2020.01)

(52) U.S. Cl.
CPC .......... *G06F 30/20* (2020.01); *G06F 2111/04* (2020.01); *G06F 2119/02* (2020.01)

(58) Field of Classification Search
CPC .......... G06F 30/20; G06F 30/25; G06F 30/27; G06F 30/28; G06F 2111/04; G06F 2119/02
See application file for complete search history.

(56) References Cited

U.S. PATENT DOCUMENTS

| 1,724,301 A | 8/1946 | Peck |
| 3,532,807 A | 10/1970 | Wall, Jr. et al. |

(Continued)

FOREIGN PATENT DOCUMENTS

| CN | 110524581 | 3/2019 |
| CN | 110064818 | 7/2019 |

(Continued)

OTHER PUBLICATIONS

Moos, Sandro, and Enrico Vezzetti. "Resistance spot welding process simulation for variational analysis on compliant assemblies." Journal of Manufacturing Systems 37 (2015): 44-71. (Year: 2015).*

(Continued)

*Primary Examiner* — Michael Edward Cocchi
(74) *Attorney, Agent, or Firm* — IPkey PLLC (57) ABSTRACT

In some examples, a method for determining weldable and unweldable portions of a seam comprises receiving a representation of a part including the seam. The method also includes discretizing a representation of the seam into a plurality of waypoints. The method also includes evaluating each waypoint from the plurality of waypoints for feasibility of welding. The method further includes generating a weld path through at least a subset of the plurality of waypoints in accordance with the feasibility of welding.

9 Claims, 5 Drawing Sheets

(56) References Cited

U.S. PATENT DOCUMENTS

| | | | |
|---|---|---|---|
| 4,011,437 A | 3/1977 | Hohn | |
| 4,021,840 A | 5/1977 | Ellsworth et al. | |
| 4,148,061 A | 4/1979 | Lemelson | |
| 4,234,777 A | 11/1980 | Balfanz | |
| 4,255,643 A | 3/1981 | Balfanz | |
| 4,380,696 A | 4/1983 | Masaki | |
| 4,412,121 A | 10/1983 | Kremers et al. | |
| 4,482,968 A | 11/1984 | Inaba et al. | |
| 4,492,847 A | 1/1985 | Masaki et al. | |
| 4,495,588 A | 1/1985 | Nio et al. | |
| 4,497,019 A | 1/1985 | Waber | |
| 4,497,996 A | 2/1985 | Libby et al. | |
| 4,515,521 A | 5/1985 | Takeo et al. | |
| 4,553,077 A | 11/1985 | Brantmark et al. | |
| 4,555,613 A | 11/1985 | Shulman | |
| 4,561,050 A | 12/1985 | Iguchi et al. | |
| 4,567,348 A | 1/1986 | Smith et al. | |
| 4,568,816 A | 2/1986 | Casler, Jr. et al. | |
| 4,575,304 A | 3/1986 | Nakagawa et al. | |
| 4,578,554 A | 3/1986 | Coulter | |
| 4,580,229 A | 4/1986 | Koyama et al. | |
| 4,587,396 A | 5/1986 | Rubin | |
| 4,590,577 A | 5/1986 | Nio et al. | |
| 4,593,173 A | 6/1986 | Bromley et al. | |
| 4,594,497 A | 6/1986 | Takahasi et al. | |
| 4,595,989 A | 6/1986 | Yasukawa et al. | |
| 4,613,942 A | 9/1986 | Chen | |
| 4,616,121 A | 10/1986 | Clocksin et al. | |
| 4,617,504 A | 10/1986 | Detriche | |
| 4,642,752 A | 2/1987 | Debarbieri et al. | |
| 4,652,803 A | 3/1987 | Kamejima et al. | |
| 4,675,502 A | 6/1987 | Haefner et al. | |
| 4,677,568 A | 6/1987 | Arbter | |
| 4,685,862 A | 8/1987 | Nagai et al. | |
| 4,724,301 A | 2/1988 | Shibata et al. | |
| 4,725,965 A | 2/1988 | Keenan | |
| 4,744,039 A | 5/1988 | Suzuki et al. | |
| 4,745,857 A | 5/1988 | Putnam et al. | |
| 4,757,180 A | 7/1988 | Kainz et al. | |
| 4,804,860 A | 2/1989 | Ross et al. | |
| 4,812,614 A | 3/1989 | Wang et al. | |
| 4,833,383 A | 5/1989 | Skarr et al. | |
| 4,833,624 A | 5/1989 | Kuwahara et al. | |
| 4,837,487 A | 6/1989 | Kurakake et al. | |
| 4,845,992 A | 7/1989 | Dean | |
| 4,899,095 A | 2/1990 | Kishi et al. | |
| 4,906,907 A | 3/1990 | Tsuchihashi et al. | |
| 4,907,169 A | 3/1990 | Lovoi | |
| 4,924,063 A | 5/1990 | Buchel et al. | |
| 4,945,493 A | 7/1990 | Huang et al. | |
| 4,969,108 A | 11/1990 | Webb et al. | |
| 4,973,216 A | 11/1990 | Domm | |
| 5,001,324 A | 3/1991 | Aiello et al. | |
| 5,006,999 A | 4/1991 | Kuno et al. | |
| 5,053,976 A | 10/1991 | Nose et al. | |
| 5,083,073 A | 1/1992 | Kato | |
| 5,096,353 A | 3/1992 | Tesh et al. | |
| 5,154,717 A | 10/1992 | Matsen, III et al. | |
| 5,159,745 A | 11/1992 | Kato | |
| 5,219,264 A | 6/1993 | McClure et al. | |
| 5,245,409 A | 9/1993 | Tobar | |
| 5,288,991 A | 2/1994 | King et al. | |
| 5,300,869 A | 4/1994 | Skaar et al. | |
| 5,329,469 A | 7/1994 | Watanabe | |
| 5,379,721 A | 1/1995 | Dessing et al. | |
| 5,380,978 A * | 1/1995 | Pryor | B23K 26/0846 219/121.79 |
| 5,457,773 A | 10/1995 | Jeon | |
| 5,465,037 A | 11/1995 | Huissoon et al. | |
| 5,479,078 A | 12/1995 | Karakama et al. | |
| 5,511,007 A | 4/1996 | Nihei et al. | |
| 5,532,924 A | 7/1996 | Hara et al. | |
| 5,570,458 A | 10/1996 | Umeno et al. | |
| 5,572,102 A | 11/1996 | Goodfellow et al. | |
| 5,598,345 A | 1/1997 | Tokura et al. | |
| 5,600,760 A | 2/1997 | Pryor | |
| 5,602,967 A | 2/1997 | Pryor | |
| 5,608,847 A | 3/1997 | Pryor | |
| 5,612,785 A | 3/1997 | Boillot et al. | |
| 5,624,588 A | 4/1997 | Terawaki et al. | |
| 5,828,566 A | 10/1998 | Pryor | |
| 5,906,761 A | 5/1999 | Gilliland et al. | |
| 5,925,268 A | 7/1999 | Britnell | |
| 5,956,417 A | 9/1999 | Pryor | |
| 5,959,425 A | 9/1999 | Bieman et al. | |
| 5,961,858 A | 10/1999 | Britnell | |
| 6,035,695 A | 3/2000 | Kim | |
| 6,044,308 A | 3/2000 | Huissoon | |
| 6,049,059 A | 4/2000 | Kim | |
| 6,084,203 A | 7/2000 | Bonigen | |
| 6,163,946 A | 12/2000 | Pryor | |
| 6,167,607 B1 | 1/2001 | Pryor | |
| 6,304,050 B1 | 10/2001 | Skaar et al. | |
| 6,429,404 B1 | 8/2002 | Tokura et al. | |
| 6,430,474 B1 | 8/2002 | DiStasio et al. | |
| 6,804,580 B1 | 10/2004 | Stoddard et al. | |
| 6,909,066 B2 | 12/2005 | Zheng et al. | |
| 7,130,718 B2 | 10/2006 | Gunnarsson et al. | |
| 7,151,848 B1 | 12/2006 | Watanabe et al. | |
| 7,734,358 B2 | 6/2010 | Watanabe et al. | |
| 7,805,219 B2 | 9/2010 | Ishikawa et al. | |
| 7,813,830 B2 | 10/2010 | Summers et al. | |
| 7,818,091 B2 | 10/2010 | Kazi et al. | |
| 7,946,439 B1 | 5/2011 | Toscano et al. | |
| 8,494,678 B2 | 7/2013 | Quandt et al. | |
| 8,525,070 B2 | 9/2013 | Tanaka et al. | |
| 8,538,125 B2 | 9/2013 | Linnenkohl et al. | |
| 8,644,984 B2 | 2/2014 | Nagatsuka et al. | |
| 9,067,321 B2 | 6/2015 | Landsnes | |
| 9,221,117 B2 | 12/2015 | Conrardy et al. | |
| 9,221,137 B2 | 12/2015 | Otts | |
| 9,666,160 B2 | 5/2017 | Patel et al. | |
| 9,685,099 B2 | 6/2017 | Lincoln | |
| 9,724,787 B2 | 8/2017 | Becker et al. | |
| 9,773,429 B2 | 9/2017 | Lincoln | |
| 9,779,635 B2 | 10/2017 | Zboray et al. | |
| 9,799,635 B2 | 10/2017 | Kuriki et al. | |
| 9,802,277 B2 | 10/2017 | Beatty et al. | |
| 9,821,415 B2 | 11/2017 | Rajagopalan et al. | |
| 9,836,987 B2 | 12/2017 | Postlethwaite et al. | |
| 9,937,577 B2 | 4/2018 | Daniel et al. | |
| 9,975,196 B2 | 5/2018 | Zhang et al. | |
| 9,977,242 B2 | 5/2018 | Patel et al. | |
| 9,993,891 B2 | 6/2018 | Wiryadinata | |
| 10,040,141 B2 | 8/2018 | Rajagopalan et al. | |
| 10,083,627 B2 | 9/2018 | Daniel et al. | |
| 10,191,470 B2 | 1/2019 | Inoue | |
| 10,197,987 B2 | 2/2019 | Battles et al. | |
| 10,198,962 B2 | 2/2019 | Postlethwaite et al. | |
| 10,201,868 B2 | 2/2019 | Dunahoo et al. | |
| 10,551,179 B2 | 2/2020 | Lonsberry et al. | |
| 11,034,024 B2 | 6/2021 | Saez et al. | |
| 11,067,965 B2 | 7/2021 | Spieker et al. | |
| 11,179,793 B2 | 11/2021 | Atherton et al. | |
| 11,407,110 B2 | 8/2022 | Lonsberry et al. | |
| 11,759,952 B2 | 9/2023 | Lonsberry et al. | |
| 2001/0004718 A1 | 6/2001 | Gilliland et al. | |
| 2004/0105519 A1 | 6/2004 | Yamada et al. | |
| 2005/0023261 A1 | 2/2005 | Zheng et al. | |
| 2006/0047363 A1 | 3/2006 | Farrelly et al. | |
| 2006/0049153 A1 | 3/2006 | Cahoon et al. | |
| 2008/0114492 A1 | 5/2008 | Miegel et al. | |
| 2008/0125893 A1* | 5/2008 | Tilove | B25J 9/1666 700/103 |
| 2009/0075274 A1 | 3/2009 | Slepnev et al. | |
| 2009/0139968 A1 | 6/2009 | Hesse et al. | |
| 2010/0114338 A1* | 5/2010 | Bandyopadhyay | B23K 37/0258 700/36 |
| 2010/0152870 A1 | 6/2010 | Wanner et al. | |
| 2010/0206938 A1 | 8/2010 | Quandt et al. | |
| 2010/0274390 A1 | 10/2010 | Bernd | |
| 2011/0141251 A1 | 6/2011 | Marks et al. | |
| 2011/0297666 A1 | 12/2011 | Ihle et al. | |

(56) References Cited

U.S. PATENT DOCUMENTS

| | | | |
|---|---|---|---|
| 2012/0096702 A1 | 4/2012 | Kingsley et al. | |
| 2012/0267349 A1 | 10/2012 | Berndl et al. | |
| 2013/0119040 A1 | 5/2013 | Suraba et al. | |
| 2013/0123801 A1 | 5/2013 | Umasathan et al. | |
| 2013/0259376 A1 | 10/2013 | Louban | |
| 2014/0088577 A1 | 3/2014 | Anastassiou et al. | |
| 2014/0100694 A1 | 4/2014 | Rueckl et al. | |
| 2014/0365009 A1 | 12/2014 | Wettels | |
| 2015/0122781 A1 | 5/2015 | Albrecht | |
| 2015/0127162 A1 | 5/2015 | Takefumi | |
| 2016/0096269 A1 | 4/2016 | Atohira et al. | |
| 2016/0125592 A1 | 5/2016 | Becker et al. | |
| 2016/0125593 A1 | 5/2016 | Becker et al. | |
| 2016/0224012 A1 | 8/2016 | Hunt | |
| 2016/0257000 A1 | 9/2016 | Guerin et al. | |
| 2016/0257070 A1 | 9/2016 | Boydston et al. | |
| 2016/0267636 A1 | 9/2016 | Duplaix et al. | |
| 2016/0267806 A1 | 9/2016 | Hsu et al. | |
| 2017/0028499 A1* | 2/2017 | Yoshida | B25J 9/163 |
| 2017/0072507 A1 | 3/2017 | Legault | |
| 2017/0132807 A1 | 5/2017 | Shivaram et al. | |
| 2017/0232615 A1 | 8/2017 | Hammock | |
| 2017/0266758 A1 | 9/2017 | Fukui et al. | |
| 2017/0364076 A1* | 12/2017 | Keshmiri | G05B 19/41 |
| 2017/0368649 A1 | 12/2017 | Marrocco et al. | |
| 2018/0043471 A1 | 2/2018 | Aoki et al. | |
| 2018/0065204 A1* | 3/2018 | Burrows | B25J 11/007 |
| 2018/0117701 A1 | 5/2018 | Ge et al. | |
| 2018/0147662 A1 | 5/2018 | Furuya | |
| 2018/0266961 A1 | 9/2018 | Narayanan et al. | |
| 2018/0266967 A1 | 9/2018 | Ohno et al. | |
| 2018/0304550 A1 | 10/2018 | Atherton et al. | |
| 2018/0322623 A1 | 11/2018 | Memo et al. | |
| 2018/0341730 A1 | 11/2018 | Atherton et al. | |
| 2019/0076949 A1 | 3/2019 | Atherton et al. | |
| 2019/0108639 A1 | 4/2019 | Tchapmi et al. | |
| 2019/0193180 A1 | 6/2019 | Troyer et al. | |
| 2019/0240759 A1 | 8/2019 | Ennsbrunner et al. | |
| 2019/0375101 A1 | 12/2019 | Miyata et al. | |
| 2020/0021780 A1 | 1/2020 | Jeong et al. | |
| 2020/0030984 A1 | 1/2020 | Suzuki et al. | |
| 2020/0114449 A1* | 4/2020 | Chang | B23K 9/0956 |
| 2020/0130089 A1 | 4/2020 | Ivkovich et al. | |
| 2020/0164521 A1 | 5/2020 | Li | |
| 2020/0180062 A1 | 6/2020 | Suzuki et al. | |
| 2020/0223064 A1 | 7/2020 | Alexander | |
| 2020/0262079 A1 | 8/2020 | Saez et al. | |
| 2020/0269340 A1 | 8/2020 | Tang et al. | |
| 2020/0316779 A1 | 10/2020 | Truebenbach et al. | |
| 2020/0409376 A1 | 12/2020 | Afrouzi et al. | |
| 2021/0012678 A1 | 1/2021 | Torrecilla et al. | |
| 2021/0158724 A1 | 5/2021 | Becker et al. | |
| 2021/0318673 A1 | 10/2021 | Kitchen et al. | |
| 2022/0016776 A1 | 1/2022 | Lonsberry et al. | |
| 2022/0226922 A1 | 7/2022 | Albrecht et al. | |
| 2022/0250183 A1 | 8/2022 | Knoener | |
| 2022/0258267 A1 | 8/2022 | Becker | |
| 2022/0266453 A1 | 8/2022 | Lonsberry et al. | |
| 2022/0305593 A1 | 9/2022 | Lonsberry et al. | |
| 2022/0324110 A1 | 10/2022 | Lonsberry et al. | |
| 2022/0402147 A1 | 12/2022 | Martin et al. | |
| 2022/0410402 A1 | 12/2022 | Lonsberry et al. | |
| 2023/0093558 A1 | 3/2023 | Takeya et al. | |
| 2023/0123712 A1 | 4/2023 | Lonsberry et al. | |
| 2023/0173676 A1 | 6/2023 | Lonsberry et al. | |
| 2023/0260138 A1 | 8/2023 | Becker et al. | |
| 2023/0278224 A1 | 9/2023 | Bunker et al. | |
| 2023/0330764 A1 | 10/2023 | Ott et al. | |
| 2024/0025041 A1 | 1/2024 | Lonsberry et al. | |

FOREIGN PATENT DOCUMENTS

| | | |
|---|---|---|
| CN | 110270997 | 9/2019 |
| CN | 111189393 | 5/2020 |
| CN | 113352317 | 9/2021 |
| EP | 3812105 | 4/2021 |
| JP | 2010269336 | 12/2010 |
| JP | 2015140171 | 8/2015 |
| JP | 223604 | 12/2015 |
| JP | 2015223604 | 12/2015 |
| JP | 2017196653 | 11/2017 |
| WO | WO 1994/003303 | 2/1994 |
| WO | WO 2004/096481 | 11/2004 |
| WO | WO 2016/013171 | 6/2017 |
| WO | 2017/115015 A1 | 7/2017 |
| WO | 2018/173655 A1 | 9/2018 |
| WO | 2019/153090 A1 | 8/2019 |

OTHER PUBLICATIONS

Liu, Zhenyu, Wanghui Bu, and Jianrong Tan. "Motion navigation for arc welding robots based on feature mapping in a simulation environment." Robotics and Computer-Integrated Manufacturing 26.2 (2010): 137-144. (Year: 2010).*

Jing, Li, Jing Fengshui, and Li En. "Rgb-d sensor-based auto path generation method for arc welding robot." 2016 Chinese control and decision conference (CCDC). IEEE, 2016. (Year: 2016).*

Wang, Xuewu, et al. "Welding robot collision-free path optimization." Applied Sciences 7.2 (2017): 89. (Year: 2017).*

International Patent Application No. PCT/US2022/017744 International Search Report and Written Opinion, dated Jun. 14, 2022 (13 pages).

International Patent Application No. PCT/US2022/017741 Invitation to Pay Additional Fees and, Where Applicable, Protest Fee, dated May 23, 2022 (2 pages).

International Patent Application No. PCT/US2022/017741 International Search Report and Written Opinion, dated Jul. 25, 2022 (23 pages).

Ahmed, S.M. (Oct. 2016) "Object Detection and Motion Planning for Automated Welding of Tibular Joints", 2016 IEEE/RSJ International Conference on Intelligent Robots and Systems, Daejeon, Korea, Oct. 9-14: pp. 2610-2615.

Bingul et al., "A real-time prediction model of electrode extension for Gmaw", IEEE/ASME Transaction on Mechatronics, vol. 11, No. 1, pp. 47-4, 2006.

Boulware, "A methodology for the robust procedure development of fillet welds", The Ohio State University Knowledge Bank, 2006.

Chandrasekaran, "Predication of bead geometry in gas metal arc welding by statistical regression analysis", University of Waterloo, 2019.

Devaraj et al., "Grey-based Taguchi multiobjective optimization and artificial intelligence-based prediction of dissimilar gas metal arc welding process performance", Metals, vol. 11, 1858, 2021.

Ding et al., A multi-bead overlapping model for robotic wire and arc additive manufacturing (WAAM), Robotics and Computer-Integrated Manufacturing, vol. 31, pp. 101-110, 20115.

Ding, et al., "Bead modelling and implementation of adaptive MAT path in wire and arc additive manufacturing", Robotics and Computer-Integrated Manufacturing, vol. 39, pp. 32-42, 2016.

Hao et al., "Effects of tilt angle between laser nozzle and substrate on bead morphology in multi-axis laser cladding", Journal of manufacturing processes, vol. 43, pp. 311-322, 2019.

Harwig, "A wise method for assessing arc welding performance and quality", Welding Journal, pp. 35-39, 2000.

He et al., "Dynamic modeling of weld bead geometry features in thick plate GMAW based on machine vision and learning", Sensors, vol. 20, 7104, 2020.

Horvath et al., "Bead geometry modeling on uneven base metal surface by fuzzy systems for multi-pass welding", Expert Systems with Applications, 186, 115356, 24 pages, 2021.

Hu et al., "Molten pool behaviors and forming appearance of robotic GMAW on complex surface with various welding positions", Journal of Manufacturing Processes, vol. 64, pp. 1359-1376, 2021.

Hu et al., "Multi-bead overlapping model with varying cross-section profile for robotic GMAW-based additive manufacturing", Journal of Intelligent Manufacturing, 2019.

(56) References Cited

OTHER PUBLICATIONS

International Application No. PCT/US2021/042218, filed Jul. 19, 2021, by Path Robotics, Inc.: International Search Report and Written Opinion, mailed Dec. 9, 2021, including Notification of Transmittal; 16 pages.

International Search Report and Written Opinion for International Application No. PCT/IB2022/061107, mailed Nov. 17, 2022, 19 pages.

International Search Report and Written Opinion issued in corresponding PCT Application No. PCT/US2023/019063, mailed Sep. 12, 2023.

Invitation to Pay Additional Fees and, Where Applicable, Protest Fee and Partial International Search Report issued in International Patent Application No. PCT/US2023/019063, dated Jul. 18, 2023, 11 pages.

Kesse et al., "Development of an artificial intelligence powered TIG welding algorithm for the prediction of bead geometry for TIG welding processes using hybrid deep learning", Metals, vol. 10, 451, 2020.

Kiran et al., "Arc interaction and molten pool behavior in the three wire submerged arc welding process", International Journal of Heat and Mass Transfer, vol. 87, pp. 327-340, 2015.

Kolahan et al., A new approach for predicting and optimizing weld bead geometry in GMAW', World Academy of Science, Engineering and Technology, vol. 59, pp. 138-141, 2009.

Larkin et al., "Automatic program generation for welding robots from CAD", IEEE International Conference on Advanced Intelligent Mechatronics (AIM), IEEE, pp. 560-565, 2016.

Li et al., "Enhanced beads overlapping model for wire and arc additive manufacturing of multi-layer multi-bead metallic parts", Journal of Materials Processing Technology, 2017.

Li et al., "A6:A28GMAW-based additive manufacturing of inclined multi-layer multi- bead parts with flat-position deposition", Journal of Materials Processing Tech, vol. 262, pp. 359-371, 2018.

Lv et al., "Levenberg-marquardt backpropagation training of multilayer neural networks for state estimation of a safety critical cyber-physical system", IEEE Transactions on Industrial Informatics, 14(8), pp. 3436-3446.

Martinez et al., "Two gas metal arc welding process dataset of arc parameters and input parameters", Data in Brief, vol. 35, 106790, 2021.

Mollayi et al., "Application of multiple kernel support vector regression for weld bead geometry prediction in robotic GMAW Process", International Journal of Electrical and Computer Engineering, vol. 8, No. pp. 2310-2318, 2018.

Murray, "Selecting parameters for GMAW using dimensional analysis", Welding Research, pp. 152s-131s, 2002

Natarajan, S. et al., "Aiding Grasp Synthesis for Novel Objects Using Heuristic-Based and Data-Driven Active Vision Methods", Frontiers in Robotics and AI, 8:696587, 2021.

Nguyen et al., "Multi-bead overlapping models for tool path generation in wire-arc additive manufacturing processes", Procedia Manufacturing, vol. 47, pp. 1123-1128, 2020.

Rao et al., "Effect of process parameters and mathematical model for the prediction of bead geometry in pulsed GMA welding", The International Journal of Advanced Manufacturing Technology, vol. 45, pp. 496-05, 2009.

Ravichandran et al., "Parameter optimization of gas metal arc welding process on AISI: 430Stainless steel using meta heuristic optimization techniques", Department of Mechatronics Engineering.

Sheng et al., "A new adaptive trust region algorithm for optimization problems", Acta Mathematica Scientia, vol. 38b, No. 2., pp. 479-496, 2018.

Suryakumar et al., "Weld bead modeling and process optimization in hybrid layered manufacturing", Computer-Aided Design, vol. 43, pp. 331-344, 2011.

Thao, et al., "Interaction model for predicting bead geometry for lab joint in GMA welding process", Computational Materials Science and Surface Engineering, vol. 1, issue. 4., pp. 237-244, 2009.

Xiao, R. et al., "An adaptive feature extraction algorithm for multiple typical seam tracking based on vision sensor in robotic arc welding" Sensors and Actuators A: Physical, 297:111533, 15 pages, 2019.

Xiong et al., "Modeling of bead section profile and overlapping beads with experimental validation for robotic GMAW-based rapid manufacturing", Robotics and Computer-Integrated Manufacturing, vol. 29, pp. 417-423, 2013.

* cited by examiner

GENERATING SIMULATED WELD PATHS FOR A WELDING ROBOT

This application claims benefit of U.S. provisional patent application Ser. No. 63/256,992 filed Oct. 18, 2021, entitled "GENERATING SIMULATED WELD PATHS FOR A WELDING ROBOT," which is hereby incorporated herein by reference in its entirety for all purposes.

TECHNICAL FIELD

The present disclosure relates generally to the field of robotic welding, and more specifically, but not by way of limitation, to generating simulated weld paths for a welding robot.

BACKGROUND

Robotic welding provides several advantages in manufacturing industries by automating welding processes. Typically, a welding robot is presented with a representation of a part (e.g., a Computer Aided Design (CAD) model) to be welded. The welding robot can determine a location of a seam to be welded on the part based on the representation of the part. A weld path can be generated based on the location of the seam to be welded with respect to the part. More recently, instead of providing the welding robot with a representation of the part, a user can indicate seams that are to be welded on the part via a user interface. The weld path can be generated by localizing the seam to be welded with respect to the part.

However, in some cases, seams that are designated to be welded cannot be physically welded by the welding robot. For example, some seams can be hidden and/or obstructed such that they may be difficult or impossible for the welding robot to access. Similarly, some portions of the seam may be in regions such that the welding robot may encounter collision by following the weld path. Existing methods of planning a path for a welding robot are generally unable to account for seams that the welding robot may find challenging to access and/or portions of the seams at which the welding robot may encounter collisions.

Therefore, there is an unmet need for new and improved systems and methods for simulated pathing for a welding robot to prevent bad welds.

DETAILED DESCRIPTION

Non-limiting examples of various aspects and embodiments of the invention are described herein and illustrated in the accompanying drawings.

Systems and methods for simulating welding paths for welding robots are described herein. Technology described herein can notify a user of seams and/or portions of the seams that cannot be welded by the welding robot. Some embodiments relate to plotting a path for a welding robot along a seam, including simulating an orientation of a welding robot and/or optimizing movements of the welding robot to improve weld quality and/or the time required to complete a weld. In some embodiments, the technology described herein can change one or more welding parameters so that the welding robot can access and weld portions of the seam.

Robots that can be configured to perform operations such as welding, brazing, bonding, a combination thereof, and/or the like are referred to herein as "welding robots." In contrast to manual operations, welding robots provide significant benefits by reducing production time, cutting cost of labor, improving safety, and conserving materials. "Robotic welding" refers to operations that can be performed by a welding robot, such as welding, brazing, bonding, and/or the like.

Some known approaches of robotic welding include generating instructions for a welding robot using computer-aided design (CAD) models of the parts. The seam(s) that are to be welded are annotated in a CAD model of the part. In such approaches, known welding robots may localize the part to be welded (e.g., using sensors 102), and then proceed to lay welds according to annotations of the CAD model.

The technology described in U.S. Application No. 63/153,109, incorporated herein by reference in its entirety can automatically and/or dynamically generate instructions for the welding robots to perform precise welding operations. The instructions can be generated without a CAD model of the part. Instead, a user can be presented with a set of possible candidate seams via a user interface, and the user can select seams to be welded. The user can change welding parameters and provide feedback on the operations performed by the welding robots via the user interface.

However, not all seams can be welded by the welding robot. For instance, due to the shape and/or size of the welding robot, certain portions of some seams may be inaccessible to the welding robot. The welding robot may be unable to reach these portions or may encounter a collision when accessing these portions of the seams. In a similar manner, certain portions of the seams may be inaccessible to the welding robot due to the physical shape and/or size of the part. Existing methodologies generally do not communicate information to a user about seams and/or portions of the seams that may be challenging or impossible for the welding robot to weld. For example, according to some known methods, when a robot attempts to weld a programed seam (e.g., derived from a CAD model), a collision may occur. The collision can be dangerous and can cause costly damage to the part and/or robot. In somewhat more sophisticated robots equipped with appropriate proximity detectors, the robot may alert the user to an imminent collision shortly before it occurs, which may still result in an incompletely welded and potentially ruined part.

The technology described herein can communicate to a user the feasibility of welding a seam before the robot attempts the weld. For instance, the technology described herein can simulate a weld and provide a color-coded user interface identifying portions of the seams based on the feasibility of being welded by a welding robot. For example, portions of the seams that can feasibly be welded by the welding robot can be denoted in a first color while the portions of the seams that cannot be feasibly welded by the welding robot can be denoted in a second color.

In some embodiments, the technology described herein can automatically provide alternative welding parameters for portions of the seams that cannot be feasibly welded by the welding robot under an initial, optimal, or default set of welding parameters so that the welding robot can weld portions of the seam. For example, the technology described herein can provide alternative tip to seam angles, alternative weld tip diameters etc., so that the welding robot can weld the portions of the seams that could not otherwise be welded. In some embodiments, the technology described herein can enable a user to choose one or more of the alternative welding parameters so that the welding robot can weld the seams. In some embodiments, the technology described herein can present alternative seams on the part to be welded that are more feasible than the seam chosen by the user.

Figure 1:
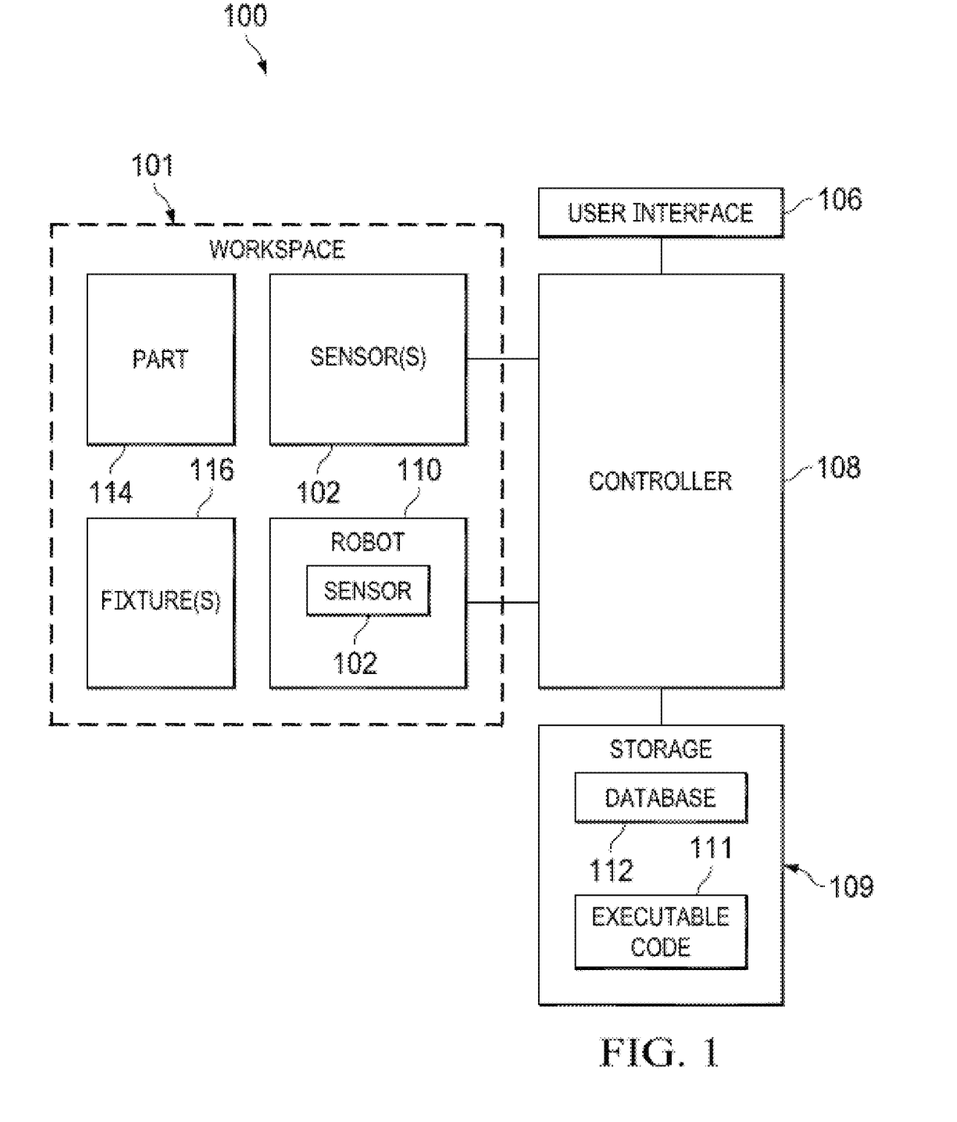
FIG. 1 is a schematic description of a system for simulating welding path (or generating simulated welding paths) for welding robots, according to an embodiment.

FIG. 1 is a schematic description of a system 100 for simulating a path for a welding robot 110, according to an embodiment. The system 100 can include a welding robot 110 to weld one or more seams on part(s) 114. The part(s) 114 can be held, positioned, and/or manipulated in the workspace 101 using fixtures and/or clamps (collectively referred to as "fixtures" 116 herein). The fixtures 116 can be configured to securely hold the part 114. In some embodiments, the fixtures can be adjustable. In some embodiments, the fixtures 116 can be motorized. For example, the fixtures 116 may include a motorized positioner that can be used to change the orientation of the part (and therefore the seam(s)) relative to gravity and/or relative to the welding robot 110. In some implementations, the welding robot 110 and the motorized positioner are programmed to work in coordination with each other so as to change the orientation of the part and thus the seam(s). The part 114 may be formed of one or more different parts. For example, part 114 may include a first part and a second part, and the first and second parts form a seam at their interface. In some implementations, the first and second parts may be held together using tack welds. In such implementations, welding may be performed at unwelded seam portions between the tack welds.

The welding robot 110 can be communicatively coupled to a controller 108 that can transmit instructions to the welding robot 110. In some embodiments, the controller 108 can simulate one or more weld paths for the welding robot and determine the feasibility of welding for the weld path(s). The seams to be welded can be displayed on a user interface 106. In some embodiments, the displayed seams can be color-coded to represent the feasibility of welding. In some embodiments, a user can interact with the user interface 106 to select seams and/or portions of seams to be welded.

The welding robot 110 can perform welding operations on the part 114. In some embodiments, the welding robot 110 can be a six-axis robot with a welding arm. The welding robot 110 can be any suitable robotic welding equipment such as Yaskawa® robotic arms, ABB® IRB robots, Kuka® robots, and/or the like. The welding robot 110 can be configured to perform arc welding, resistance welding, spot welding, TIG welding, MAG welding, laser welding, plasma welding, a combination thereof, and/or the like. In some embodiments, the welding robot 110 can include a weld head (not shown in FIG. 1). The weld heads (or welding tools) can include tubes, pipes, cables, and other components that enable the welding robot 110 to perform robotic welding.

The welding robot 110 can be communicably coupled to the controller 108. The instructions generated by the controller 108 can be transmitted to the welding robot 110. The welding robot 110 can perform welding operations on the part 114 based on the instructions from the controller 108. The controller can determine seams to be welded, feasibility of welding the seams, and simulate weld paths for the seams to be welded.

The controller 108 can include one or more processors (e.g., CPU). The processor(s) can be any suitable processing device configured to run and/or execute a set of instructions or code 111, and can include one or more data processors, image processors, graphics processing units, digital signal processors, and/or central processing units. The processor(s) can be, for example, a general-purpose processor, a Field Programmable Gate Array (FPGA), an Application Specific Integrated Circuit (ASIC), and/or the like. The processor(s) can be configured to run and/or execute application processes and/or other modules, processes and/or functions associated with the system 100.

In examples, the storage 109 stores executable code 111, which, when executed, causes the controller 108 to perform one or more actions attributed herein to the controller 108, or, more generally, to the system 100. In examples, the executable code 111 is a single, self-contained, program, and in other examples, the executable code is a program having one or more function calls to other executable code which may be stored in storage 109 or elsewhere. In some examples, one or more functions attributed to execution of the executable code 111 may be implemented by hardware. For instance, multiple processors may be useful to perform one or more discrete tasks of the executable code 111.

In some embodiments, the controller 108 can include one or more modules (e.g., modules in a software code and/or stored in memory) that, when executed by a processor, are configured to evaluate the feasibility of a seam to be welded by the welding robot 110 and to generate a weld path for the welding robot 110. In some embodiments, the controller 108 can determine candidate seams to be welded as described in U.S. Application No. 63/153,109, the entire disclosure of which is incorporated herein by reference. Alternatively, the controller 108 can receive one or more candidate seams from a user. For example, a user can annotate candidate seams on a representation of a part, such as CAD model, and transmit the annotated representation to the controller. Each candidate seam can be evaluated for feasibility of welding. In some implementations, the representation of the part 114 may be the CAD model which may be stored in the storage 109. In some implementations, the representation of the part 114 may be generated by the controller 108 after receiving one or more images (and/or possibly, other data, such as laser reflection data or audio data) from one or more sensors 102 in the workspace. The generated representations may be point clouds or they could be 2D image data. In some implementations, the one or more sensors 102 may be positioned on the robot 110 (e.g., on a weld head of the robot 110) and may be configured to collect data (e.g., laser reflection data or image data) as the robot 110 moves about the workspace. In some implementations, the one or more sensors 102 may be positioned on a robot (different from the welding robot 110) that is configured to move in the workspace. The representation of the part 114 includes a representation of one or more candidate seams.

Figure 2A:
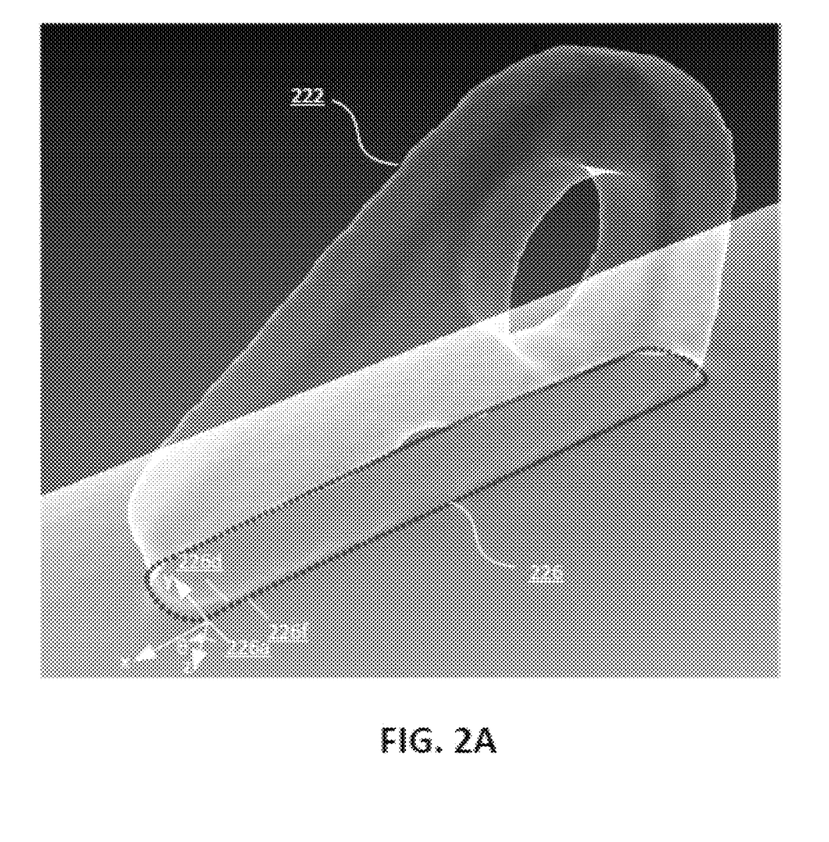
FIG. 2A is an illustration of a representation of a part having a candidate seam that is discretized into a sequence of waypoints, according to an embodiment.
Figure 2B:
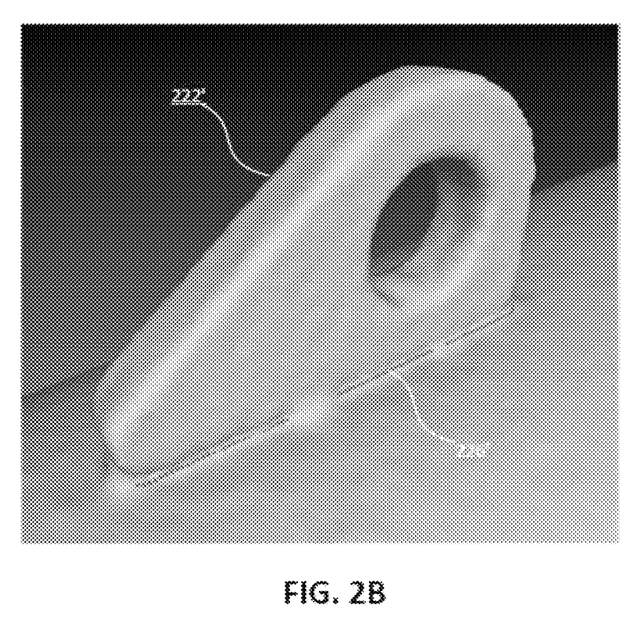
FIG. 2B is an illustration of a representation of a part having a candidate seam that is discretized into a sequence of waypoints, according to an embodiment.

The one or more modules can discretize a candidate seam into a sequence of waypoints. FIG. 2A and FIG. 2B illustrate representations 222 and 222' of an example part. A candidate seam on the part is discretized into a sequence of waypoints 226 in FIG. 2A and 226' in FIG. 2B. The gaps the sequence of waypoints in FIG. 2B represents tack welds. For example, in some implementations, the part includes tack welds, which are small and temporary welds to hold two parts together for final welding. A waypoint (e.g., 226a, 226d, 226f, etc., collectively sequence of waypoints 226 in FIG. 2A) can constrain an orientation of the weld head of the robot 110 in three (spatial/translational) degrees of freedom. Typically, constraints in orientation of the weld head of the robot 100 are provided in one or two rotational degrees of freedom about each waypoint, for the purpose of producing some desired weld of some quality; the constraints are typically relative to the surface normal vectors emanating from the waypoints and the path of the weld seam. For example, the position of the weld head can be constrained in x-, y-, and z-axes, as well as about one or two rotational axes perpendicular to an axis of the weld wire or tip of the welder, all relative to the waypoint and some nominal coordinate system attached to it. These constraints in some embodiments may be bounds or acceptable ranges for the angles. The ideal or desired weld angle (or sometimes referred to as work angle) may vary based on part or seam geometry, the direction of gravity relative to the seam, and many other factors. For example, in a 90-degree T-joint, the desired weld angle is the bisecting angle at 45-degrees. In some cases, there a 10-degree offset from the bisecting angle is tolerable. For the same type of joint, a travel angle of −5 to −10 degrees produces desired quality weld beads. It can be appreciated that for different types of joint, the work and travel angles may be different from the above-noted example ranges. However, in all cases the position of the weld head can be held (constrained) by each waypoint at any suitable orientation relative to the seam. Typically, the weld head will be unconstrained about a rotational axis (θ) coaxial with an axis of the weld head. For instance, in FIG. 2A, each waypoint (e.g., 226a, 226d, 226f, etc.) can define a position of the weld head of the welding robot 110 such that at each waypoint, the weld head is in a fixed position and orientation relative to the weld seam. In some implementations, the waypoints 226 are discretized finely enough to make the movement of the weld head substantially continuous.

The controller 108 (e.g., one or more modules included in the controller) can divide each waypoint into multiple nodes. For example, in FIG. 2A, waypoint 226a can be divided into multiple nodes. In a similar manner, waypoint 226d can be divided into multiple nodes. Similarly, waypoint 226f can be divided into multiple nodes. Each node can represent a possible orientation of the weld head at that waypoint. As a non-limiting example, the weld head can be unconstrained about a rotational axis coaxial with the axis of the weld head such that the weld head can rotate (e.g., 360 degrees) along a rotational axis θ at each waypoint. Each waypoint 226 can be divided into 20 nodes, such that each node of each waypoint 226 represent the weld head at 18 degree of rotation increments. For instance, a first waypoint-node pair can represent rotation of the weld head at 0 degrees, a second waypoint-node pair can represent rotation of the weld head at from 18 degrees, a third waypoint-node pair can represent rotation of the weld head at 36, etc. It should be understood that each waypoint can be divided into 2, 10, 20, 60, 120, 360, or any suitable number of nodes. The subdivision of nodes can represent the division of orientations in more than 1 degree of freedom. For example, the orientation of the welder tip about the waypoint can be defined by 3 angles. A weld path can be defined by linking each waypoint-node pair. Thus, the distance between waypoints and the offset between adjacent waypoint's nodes can represent an amount of translation and rotation of the weld head as the weld head moves between node-waypoint pairs.

The controller 108 (e.g., the one or more modules included in the controller) can evaluate each waypoint-node pair for feasibility of welding. For instance, consider the non-limiting example of dividing waypoint 226a into 20 nodes. The controller 108 can evaluate whether the first waypoint-node pair representing the weld head held at 0 degrees would be feasible. Put differently, the controller 108 can evaluate whether the robot would collide or interfere with the part, the fixture, or the welding robot itself, if placed at the position and orientation defined by that waypoint-node pair. In a similar manner, the controller can evaluate whether the second waypoint-node pair, third waypoint-node pair, etc., would be feasible. The controller can evaluate each waypoint similarly. In this way, all feasible nodes of all waypoints can be determined.

In some examples, a collision analysis as described herein may be performed by comparing a 3D model of the workspace 101 and/or a 3D model of the robot 110 and/or the model/representation of parts 114 to determine whether the two models overlap, and optionally, some or all of the triangles representing various elements in the workspace and the robot overlap. If the two models overlap, the controller 108 may determine that a collision is likely. If the two models do not overlap, the controller 108 may determine that a collision is unlikely. More specifically, in some examples, the controller 108 may compare the models for each of a set of waypoint-node pairs (such as the waypoint-node pairs described above) and determine that the two models overlap for a subset, or even possibly all, of the waypoint-node pairs. For the subset of waypoint-node pairs with respect to which model intersection is identified, the controller 108 may omit the waypoint-node pairs in that subset from the planned path and may identify alternatives to those waypoint-node pairs. The controller 108 may repeat this process as needed until a collision-free path has been planned. The controller 108 may use a flexible collision library (FCL), which includes various techniques for efficient collision detection and proximity computations, as a tool in the collision avoidance analysis. The FCL is useful to perform multiple proximity queries on different model representations, and it may be used to perform probabilistic collision identification between point clouds. Additional or alternative resources may be used in conjunction with or in lieu of the FCL.

The controller 108 can simulate a weld path. A weld path can be a path that the welding robot takes in order to weld the candidate seam. In some embodiments, the weld path may include all the waypoints of a candidate seam. In some embodiments, the weld path may include some but not all of the waypoints of the candidate seam. Simulating the weld path can include simulating the motion of the robot and the weld head as the weld head moves between each waypoint-node pair. For example, assuming a 0-degree node of waypoint 226d is feasible, the controller 108 can simulate motion of the robot, weld head, and/or fixture holding the part as the weld head moves from waypoint 226d to a 0-degree node of waypoint 226f. If a 0-degree node of waypoint 226f is infeasible for welding and/or motion between the 0-degree node of waypoint 226d and the 0-degree node of 226f is infeasible (e.g., produces a simulated collision), the controller can simulate a motion of the weld head from the 0 degree node of waypoint 226d to a 20 degree node of 226f. Similarly, if that motion is infeasible, motion from the 0-degree node of waypoint 226d to a 40-degree node of 226f can be simulated. Once a feasible path between node-waypoint pairs 226d and 226f is identified, a feasible node-waypoint pair for the next sequential waypoint can be identified by simulating motion of the weld head from waypoint 226f. Those skilled in the art will recognize that many search trees or other strategies may be employed to evaluate the space of feasible node-waypoint pairs. As discussed in further detail herein, a cost parameter can be assigned or calculated for movement from each node-waypoint pair to a subsequent node-waypoint pair. The cost parameter can be associated with a time to move, an amount of movement (e.g., including rotation) between node-waypoint pairs, and/or a simulated/expected weld quality produced by the weld head during the movement.

In instances in which no nodes are feasible for welding for one or more waypoints and/or no feasible path exists to move between a previous waypoint-node pair and any of the waypoint-node pairs of a particular waypoint, then the controller 108 can determine alternative welding parameters such that at least some additional waypoint-node pairs become feasible for welding. For example, if the controller determines that none of the waypoint-node pairs for waypoint 226 a are feasible, thereby making waypoint 226 unweldable, the controller 108 can determine an alternative welding parameter such as an alternative weld angle so that at least some waypoint-node pairs for waypoint 226 a become weldable. For example, the controller can remove or relax the constraints on rotation about the x and/or y axis. Similarly stated, the controller can allow the weld angle to vary in one or two additional rotational (angular) dimensions. For example, the controller 108 can divide waypoint that is unweldable into two-or three-dimensional nodes. Each node can then be evaluated for welding feasibility by simulating a position of the welding robot and weld held in various weld angles and rotational states. The additional rotation about the x-and/or y-axes or other degrees of freedom may make the waypoints accessible to the weld head such that the weld head does not encounter any collision. In some implementations, the controller 108—in instances in which no nodes are feasible for welding for one or more waypoints and/or no feasible path exists to move between a previous waypoint-node pair and any of the waypoint-node pairs of a particular waypoint—can use the degrees of freedom provided by the motorized positioner in determining feasible paths between a previous waypoint-node pair and any of the waypoint-node pairs of a particular waypoint.

In evaluating the feasibility of welding at each of the divided nodes or node-waypoint pairs, the controller 108 may perform multiple computations. In some examples, each of the multiple computations may be mutually exclusive from one another. In some examples, the first computation may include kinematic feasibility computation, which computes for whether the arm of the robot 110 of the welding robot being employed can mechanically reach (or exist) at the state defined by the node or node-waypoint pair. In some examples, in addition to the first computation, a second computation—which may be mutually exclusive to the first computation—may also be performed by the controller 108. The second computation may include determining whether the arm of the robot 110 will encounter a collision (e.g., collide with the workspace 101 or a structure in the workspace 101) when accessing the portion of the seam (e.g., the node or node-waypoint pair in question).

The controller 108 may perform the first computation before performing the second computation. In some examples, the second computation may be performed only if the result of the first computation is positive (e.g., if it is determined that the arm of the robot 110 can mechanically reach (or exist) at the state defined by the node or node-waypoint pair). In some examples, the second computation may not be performed if the result of the first computation is negative (e.g., if it is determined that the arm of the robot 110 cannot mechanically reach (or exist) at the state defined by the node or node-waypoint pair).

The kinematic feasibility may correlate with the type of robotic arm employed. For the purposes of this description, it is assumed that the welding robot 110 includes a six-axis robotic welding arm with a spherical wrist. The six-axis robotic arm can have 6 degrees of freedom—three degrees of freedom in X-, Y-, Z-cartesian coordinates and three additional degrees of freedom because of the wrist-like nature of the robot 110. For example, the wrist-like nature of the robot 110 results in a fourth degree of freedom in wrist-up/-down manner (e.g., wrist moving in +y and −y direction), a fifth degree of freedom in wrist-side manner (e.g., wrist moving in −x and +x direction), and sixth degree of freedom in rotation. In some examples, the welding torch is attached to the wrist portion of the robot 110.

As noted above, the controller 108 can evaluate whether the robot 110 would collide or interfere with the part 114, the fixture 116, or anything else in the workspace 101, including the robot 110 itself, if placed at the position and orientation defined by that waypoint-node pair. Once the controller 108 determines the states in which the robotic arm can exist, the controller 108 may perform the foregoing evaluation (e.g., regarding whether the robot would collide something in its environment) using the second computation.

Based on the generated/simulated weld paths, the controller 108 can optimized the weld path for welding. (Optimal and optimize, as used herein, does not refer to determining an absolute best weld path, but generally refers to techniques by which weld time can be decreased and/or weld quality improved relative to less efficient weld paths.) For example, the controller can determine a cost function that seeks local and/or global minima for the motion of the welding robot 110. Typically, the optimal weld path minimizes weld head rotation, as weld head rotation can increase the time to weld a seam and/or decrease weld quality. Accordingly, optimizing the weld path can include determining a weld path through a maximum number of waypoints with a minimum amount of rotation.

In some embodiments, the weld path may not include all of the waypoints of a candidate seam. Put differently, it may be possible that portions of a candidate seam are unweldable. That is, some waypoints may be feasible for welding while other waypoints may be unweldable at any node and/or with any acceptable welding parameters. In such embodiments, the controller 108 may transmit this information to the user interface 106, such that the candidate seam is color-coded when displayed to the user. For instance, weldable portions of the candidate seam may be displayed in one color while the non-weldable portions of the candidate seam may be displayed in another color. Additionally or alternatively, the controller 108 may determine alternative welding parameters to increase the number of weldable waypoints on the candidate seam and transmit various options of alternative welding parameters to the user via the user interface 106.

In some embodiments, the controller 108 may determine that an entire candidate seam is unweldable. In such embodiments, the controller 108 may transmit this information to the user interface 106. Additionally, or alternatively, the controller 108 may determine other candidate seams on the part 114 that are weldable by the welding robot 110. The controller 108 may transmit a list of weldable candidate seams to the user interface 106 to be displayed to the user.

Figure 3A:
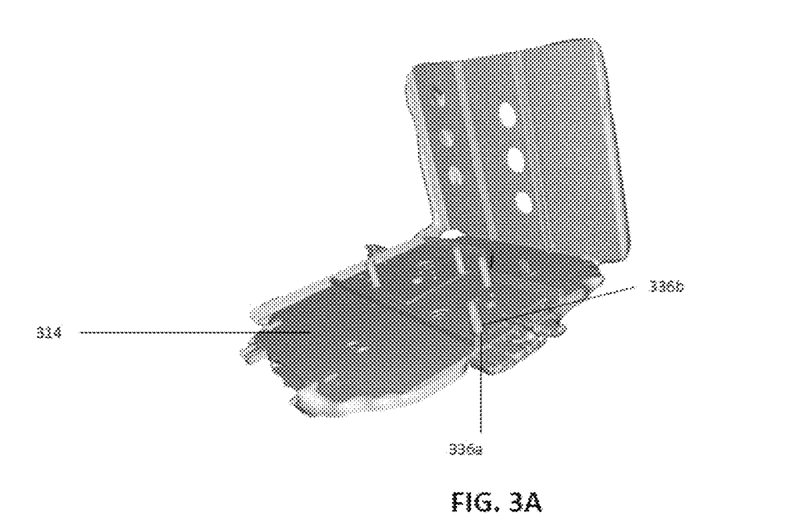
FIG. 3A illustrates the display of weldable and unweldable portions on a candidate seam on a part, according to an embodiment.
Figure 3B:
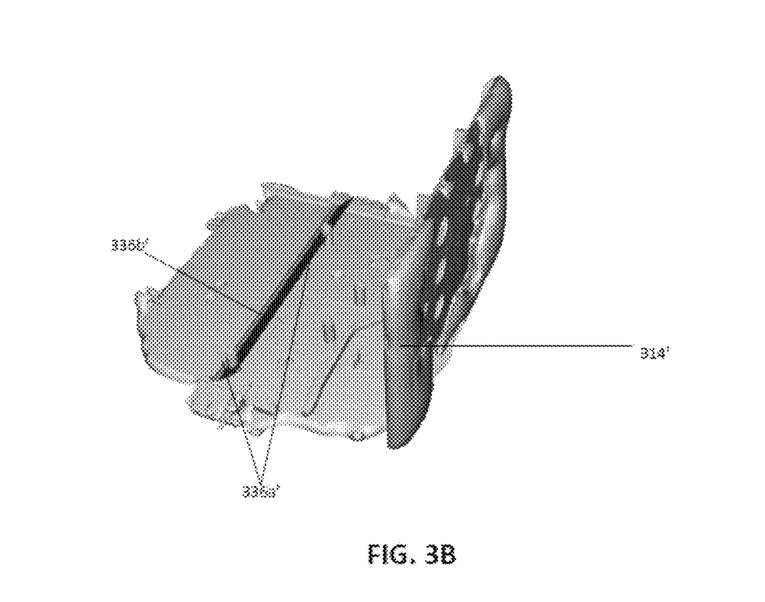
FIG. 3B illustrates the display of weldable and unweldable portions on a candidate seam on a part, according to an embodiment.

The user interface 106 can be communicably coupled to the controller 108. The user interface 106 can enable a user to interact with the system 100. For example, the user interface 106 can display a candidate seam by displaying the weldable portions in one color and the unweldable portions in another color. FIGS. 3A and 3B illustrate the display of candidate seams on example part 114 and part 114'. As seen in FIGS. 3A and 3B, the unweldable portions can be indicated in one color 336a/336a' (e.g., red) while the weldable portions can be indicated in a different color 336b/336b' (e.g., green).

As discussed above, if some portions or all of the candidate seam is determined to be unweldable, the controller 108 can determine alternative welding parameters so that a larger portion of the candidate seam can be welded by the welding robot 110. The controller 108 can transmit alternative welding parameters to increase a weldable portion on a candidate seam to the user interface 106. The user interface 106 can display a list of alternative welding parameters to the user. In some embodiments, the user interface 106 can also display a simulation of an optimized weld path for each of the alternative welding parameters. In some embodiments, the user can select a specific alternative welding parameter (e.g., by clicking on that welding parameter and/or by clicking a widget associated with that welding parameter) via the user interface 106. The controller 108 can change the weld path for the welding robot 110 based on the user's selection of the welding parameter.

In some embodiments, if the controller 108 determines that the entire candidate seam is unweldable, the controller 108 can transmit a list of alternative candidate seams on the part 114 to the user interface 106. The user interface 106 can display a list of the alternative candidate seams to the user. In some embodiments, the user interface 106 can also display a simulation of an optimized weld path for each of the alternative candidate seams. In some embodiments, the user can select a specific alternative candidate seam (e.g., by clicking on that candidate seam and/or by clicking a widget associated with that candidate seam) via the user interface 106. The controller 108 can change the weld path for the welding robot 110 based on the user's selection of the candidate seam. For example, the controller 108 can discretize the chosen candidate seam into waypoints and determine the feasibility of welding for each waypoint. Some non-limiting examples of the user interface 106 include menu-driven interface, graphical user interface (GUI), touchscreen GUI, a combination thereof, and/or the like.

In some embodiments, the representation of candidate seams with weldable and unweldable portions, the evaluation of waypoints, and the optimized weld path can be stored in a storage 109 including a database 112. In some embodiments, the database 112 can be stored in a memory device such as a random-access memory (RAM), a memory buffer, a hard drive, an erasable programmable read-only memory (EPROM), an electrically erasable read-only memory (EEPROM), a read-only memory (ROM), Flash memory, and the like. In some embodiments, the database 112 can be stored on a cloud-based platform such as Amazon Web Services®.

Figure 4:
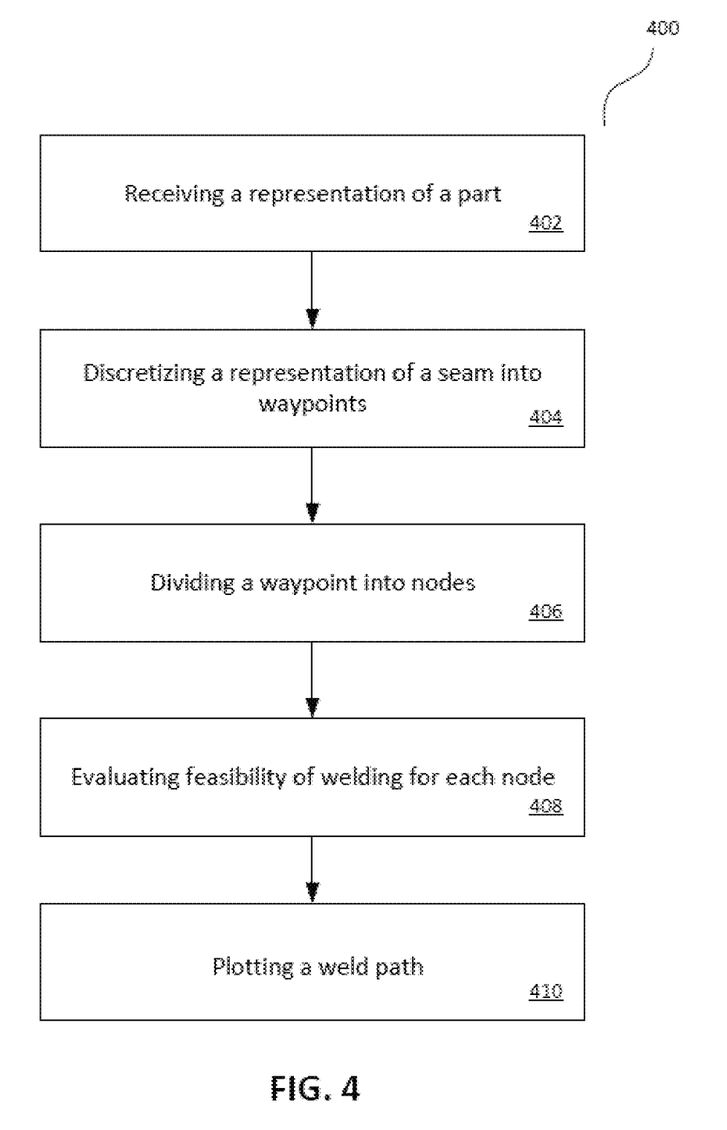
FIG. 4 is a flowchart of a method for simulating pathing for a welding robot, according to an embodiment.

FIG. 4 is a flowchart of a method 400 for simulating pathing for a welding robot, according to an embodiment. At 402, the method includes receiving a representation of a part. In some embodiments, the representation of the part can be an annotated CAD model with annotated candidate seams. Alternatively, the representation of the part can be a two-dimensional and/or a three-dimensional image of the part. In some embodiments, a controller (e.g., controller 108 in FIG. 1) may identify various candidate seams using the two-dimensional and/or a three-dimensional image of the part as described in U.S. Application No. 63/153,109, incorporated herein by reference in its entirety. A representation of the part along with the candidate seams can be generated from the two-dimensional and/or a three-dimensional images of the part.

At 404, a representation of the candidate seam can be discretized into multiple waypoints (e.g., sequence of waypoints 226 in FIG. 2A and/or sequence of waypoints 226' in FIG. 2B). The waypoints can be configured to constrain an orientation of the weld head of a welding robot (e.g., welding robot 110 in FIG. 1) in three or more degrees of freedom. For example, the waypoints may restrict the motion and/or orientation of the weld head along three translational axes and two rotational axes (e.g., fixing the position and weld angle).

At 406, each waypoint can be divided into multiple nodes. Each node can represent unconstrained degrees of freedom (e.g., unconstrained rotational axes) of the weld head at that waypoint. At 408, each node can be evaluated for feasibility of welding. The feasibility of welding can be binary (e.g., collision/no collision) or can include a likelihood of the node being welded. For example, the feasibility of welding can be a represent a probability of welding the node without the weld head and/or robot encountering collisions. In some embodiments, a threshold value (e.g., binary "no collision" or a threshold probability of a collision) can be assigned in order to evaluate the feasibility of welding. If the likelihood of welding the node is equal to or above the threshold value, the node can be categorized as weldable. However, if the likelihood of welding the node is below the threshold value, the node can be categorized as unweldable. The analysis performed by the controller in determining the feasibility of welding at a particular node or node-waypoint pair is described at length in the attached Appendix A.

At 410, depending on the feasibility of welding, a weld path can be plotted through at least some waypoints of the candidate seam. For example, based on the evaluation of feasibility of welding for each node of each waypoint, a weld path can be plotted through each waypoint for which at least one feasible node exists. As discussed above, not all waypoints may be weldable. That is, all the nodes of some waypoints may be unweldable. Such waypoints can be categorized as unweldable waypoints. The weld path can be plotted by simulating the movement of the welding robot as the weld head moves through the waypoints. For example, the movement can be simulated by determining whether the welding head can access the waypoints and whether the welding robot can move the welding head through the waypoints without encountering collision.

In some instances, the weld path can be plotted through all waypoints, thereby making the entire seam weldable. Alternatively, the weld path can be plotted through waypoints that are weldable, thereby making portions of the seam unweldable. An indication of portions of the seam that are determined to be unweldable can be transmitted to a user via a user interface. In some embodiments, alternative welding parameters can be determined to make portions of the seam that are unweldable more likely to be welded by the welding robot. Some examples of alternative welding parameters can include weld angle, diameter of the welding tip, etc.

In instances in which the seam or a portion of the seam is unweldable, the constraints imposed by each unweldable waypoint can relaxed. For instance, if the waypoints were configured to constrain the weld head in five degrees of freedom, that condition can be relaxed such that the waypoints only constrain the weld head in three or four degrees of freedom. Similarly stated, the weld angle can be allowed to vary. In this way, the dimensionality of nodes of unweldable waypoints can be increased (e.g., from one dimension to two- or three-dimensions). The simulation of the motion of the weld head can be repeated through the waypoints with the dimensionally increased nodes. The weld path can also be optimized through waypoints after relaxing the weld parameters.

In some instances, an option to vary the weld angle or otherwise alter the welding parameters can be presented to the user via a user interface. For example, the user can be informed that one or more waypoints (e.g., a portion of the seam) is unweldable at a default (e.g., 45 degree) weld angle, but would become weldable if the weld angle were allowed to vary. For example, before or after evaluating and/or simulating weld paths with dimensionally increased nodes the user can be asked whether it would be acceptable to allow the weld angle to vary by 5 degrees, 10 degrees, 15 degrees, or any other suitable angle. If the user indicates that such an alteration to weld parameters is acceptable, the seam can be welded with the altered weld parameters. As another example, the user can be informed that one or more waypoints is unweldable with a default (e.g., currently attached) weld head, but if the weld head were altered (e.g., a smaller weld head attached) previously unweldable waypoints would become weldable. If the user changes the weld head or authorizes the welding robot to automatically change weld heads, the seam can be welded with the alternate weld head.

For each weld path, the method can further include minimizing a cost function for the weld path. For example, the parameters of the cost function can include the waypoints, the nodes associated with each waypoint, and a cost associated with movement of the weld head to each waypoint-node pair from an immediately prior waypoint-node pair. For example, in FIG. 2A, the parameter can include the cost associated with movement of the weld head from a feasible node of waypoint 226a to a feasible node of waypoint 226b. The weld path with minimum movement of the weld head can be determined as the optimized weld path.

As discussed above, the seams with portions that are weldable and unweldable can be displayed to a user via a user interface. The user may further be presented with options to select alternative seams to be welded and/or alternative welding parameters such that the weld head can weld larger portions of the seams. In some embodiments, the probability of welding (e.g., likelihood of weldability) of various portions of the seam may be displayed to the user via the user interface.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and embodiments are possible in view of the above teachings. The embodiments were chosen and described in order to explain the principles of the invention and its practical applications, they thereby enable others skilled in the art to utilize the invention and various embodiments with various modifications as are suited to the particular use contemplated. It is intended that the following claims and their equivalents define the scope of the invention.

The invention claimed is:

1. A computer implemented robotic welding method, comprising:
   providing a welding robot comprising a welding arm and a motorized positioner coupled to a weld head, wherein the welding arm is configured to provide the weld head with one or more first degrees of freedom, wherein the motorized positioner is configured to provide the weld head with one or more second degrees of freedom;
   receiving, in a non-transitory memory communicatively coupled to a processor and to the welding robot, a digital representation of a plurality of parts including a digital seam representation of a seam to be welded between the plurality of parts, wherein the digital representation of the plurality of parts comprises a computer aided design (CAD) representation of the plurality of parts;
   discretizing, by the processor, the digital seam representation into a plurality of sequentially-ordered waypoints in which each separate waypoint of the plurality of waypoints is spaced along the digital seam representation and constrains an orientation of the weld head in three or more degrees of freedom, and dividing each said waypoint of the plurality of waypoints into a plurality of nodes of the waypoint, wherein each node of the plurality of nodes is associated with a corresponding position and a corresponding orientation of the weld head;
   evaluating, by the processor, a welding feasibility of each said node of the plurality of nodes associated with each said waypoint of the plurality of waypoints based on determining, from at least the digital representation, whether the weld head, when constrained at a given waypoint of the plurality of waypoints, would encounter a collision and/or at least one infeasible weld parameter at a first waypoint;
   modifying, by the processor, at least one constraint on at least the first waypoint of the plurality of waypoints, based on at least one of the one or more first degrees of freedom or the one or more second degrees of freedom, in response to determining that the weld head would encounter a collision and/or at least one infeasible weld parameter at the first waypoint;
   generating, by the processor, a weld path through at least a subset of the plurality of waypoints wherein the subset includes the first waypoint after modifying the at least one constraint, wherein the welding feasibility of at least one node associated with each said waypoint of the subset of the plurality of waypoints is greater than a threshold feasibility value, and wherein the welding feasibility of each said node of the plurality of nodes associated with a waypoint after a last waypoint of the subset of the plurality of waypoints is less than the threshold feasibility value;
   providing, by the processor, the weld path to the welding robot;
   welding the part along the weld path with the weld head; and sending a signal indicating that a portion of the seam after the last waypoint of the subset of the plurality of waypoints is unweldable.

2. The computer implemented robotic welding method of claim 1, wherein evaluating each said node of the plurality of nodes for the welding feasibility includes assigning a likelihood of the welding feasibility at each said node.

3. The computer implemented robotic welding method of claim 1, wherein:
   a work angle, travel angle, and each said waypoint from the plurality of waypoints constrains the orientation of the weld head in five degrees of freedom; and
   the plurality of nodes for each said waypoint of the plurality of waypoints represent an unconstrained sixth degree of freedom of the weld head at that waypoint.

4. The computer implemented robotic welding method of claim 3, wherein evaluating, for each said waypoint of the plurality of waypoints, each said node of the plurality of nodes associated with that waypoint for the welding feasibility includes:
   simulating a movement of the welding robot, including the weld head, to that waypoint and that node from an immediately prior waypoint; and
   determining whether at least one of the weld head or the welding robot is predicted to collide with at least one of the welding robot, the part, or a fixture based on movement of the weld head to that waypoint and that node from the immediately prior waypoint.

5. The computer implemented robotic welding method of claim 3, wherein evaluating, for each said waypoint of the plurality of waypoints, each said node of the plurality of nodes associated with that waypoint for the welding feasibility includes:
   simulating a movement of the welding robot, including the weld head, to that waypoint and that node from an immediately prior waypoint-node pair; and
   determining whether at least one of the weld head or the welding robot is predicted to collide with at least one of the welding robot, the part, or a fixture based on movement of the weld head to that waypoint and that node from the immediately prior waypoint-node pair,
   the method further comprising:
   determining, for at least one waypoint of the plurality of waypoints, a cost associated with movement of the weld head to that waypoint from the immediately prior waypoint-node pair in response to determining that at least one of the weld head or the welding robot is not predicted to collide with at least one of the welding robot, the part, or the fixture when moving to that waypoint and that node from the immediately prior waypoint-node pair.

6. The computer implemented robotic welding method of claim 5, further comprising:
   minimizing a cost function for the weld path by searching a parameter space that includes:
   the plurality of waypoints,
   the plurality of nodes associated with each said waypoint of the plurality of waypoints, and
   for each said node of the first waypoint, a node cost associated with movement of the weld head to each said node from another node of a different waypoint of the plurality of waypoints that is immediately prior to the first waypoint.

7. The computer implemented robotic welding method of claim 1, wherein the at least one infeasible weld parameter includes at least one of a weld angle or a work angle.

8. The computer implemented robotic welding method of claim 1, wherein modifying the constraint comprises permitting a weld angle of the weld head to vary in one or more rotational dimensions.

9. A robotic welding system, comprising:
   a welding robot comprising a welding arm and a motorized positioner coupled to a weld head, wherein the welding arm is configured to provide the weld head with one or more first degrees of freedom, wherein the motorized positioner is configured to provide the weld head with one or more second degrees of freedom; and
   a controller comprising a non-transitory memory communicatively coupled to a processor and to the welding robot, the non-transitory memory comprising instructions which, when executed by the processor, cause operations comprising:
   receiving, by the processor, a digital representation of a plurality of parts including a digital seam representation of a seam to be welded between the plurality of parts, wherein the digital representation of the plurality of parts comprises a computer aided design (CAD) representation of the plurality of parts;
   discretizing, by the processor, the digital seam representation into a plurality of sequentially-ordered waypoints in which each separate waypoint of the plurality of waypoints is spaced along the digital seam representation and constrains an orientation of the weld head in three or more degrees of freedom, and dividing each said waypoint of the plurality of waypoints into a plurality of nodes of the waypoint, wherein each node of the plurality of nodes is associated with a corresponding position and a corresponding orientation of the weld head;
   evaluating, by the processor, a welding feasibility of each said node of the plurality of nodes associated with each said waypoint of the plurality of waypoints based on determining, from at least the digital representation, whether the weld head, when constrained at a given waypoint of the plurality of waypoints, would encounter a collision and/or at least one infeasible weld parameter at a first waypoint;
   modifying, by the processor, at least one constraint on at least the first waypoint of the plurality of waypoints, based on at least one of the one or more first degrees of freedom or the one or more second degrees of freedom, in response to determining that the weld head would encounter a collision and/or at least one infeasible weld parameter at the first waypoint;
   generating, by the processor, a weld path through at least a subset of the plurality of waypoints wherein the subset includes the first waypoint after modifying the at least one constraint, wherein the welding feasibility of at least one node associated with each said waypoint of the subset of the plurality of waypoints is greater than a threshold feasibility value, and wherein the welding feasibility of each said node of the plurality of nodes associated with a waypoint after a last waypoint of the subset of the plurality of waypoints is less than the threshold feasibility value;
   providing, by the processor, the weld path to the welding robot for welding the part along the weld path with the weld head;

sending, by the processor, a signal indicating that a portion of the seam after the last waypoint of the subset of the plurality of waypoints is unweldable; and welding the part along the weld path with the weld head.

* * * * *